(12) United States Patent
Kim et al.

(10) Patent No.: US 8,709,184 B2
(45) Date of Patent: Apr. 29, 2014

(54) SINGLE WALLED CARBON NANOTUBE SATURABLE ABSORBER PRODUCTION VIA MULTI-VACUUM FILTRATION METHOD

(71) Applicant: Korea Advanced Institute of Science and Technology, Daejeon (KR)

(72) Inventors: Soo Hyun Kim, Daejeon (KR); Kyung-Suo Kim, Seoul (KR); Sung Yoon Ryu, Daejeon (KR); Won Sik Kwon, Jeonllabuk-do (KR); Hyub Lee, Seoul (KR); Jin Hwan Kim, Gyeonggi-do (KR); Jin Doo Choi, Seoul (KR); Seung Hwan Jo, Daejeon (KR); Seung Ryeol Oh, Daegu (KR); Sang Wook Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/739,534

(22) Filed: Jan. 11, 2013

(65) Prior Publication Data

US 2013/0180650 A1    Jul. 18, 2013

(30) Foreign Application Priority Data

Jan. 12, 2012    (KR) .................. 10-2012-0003711

(51) Int. Cl.
*B29C 65/52*    (2006.01)
*B32B 37/12*    (2006.01)
*B32B 38/10*    (2006.01)
*B32B 43/00*    (2006.01)

(52) U.S. Cl.
USPC ............ 156/152; 156/155; 156/278; 156/280

(58) Field of Classification Search
USPC .................... 156/152, 155, 278, 280
See application file for complete search history.

(56) References Cited

U.S. PATENT DOCUMENTS

| | | | |
|---|---|---|---|
| 6,602,932 B2 * | 8/2003 | Feldheim et al. | 523/201 |
| 7,008,563 B2 * | 3/2006 | Smalley et al. | 252/511 |
| 7,264,876 B2 * | 9/2007 | Smalley et al. | 428/407 |
| 7,371,666 B2 * | 5/2008 | Swihart et al. | 438/507 |
| 7,375,369 B2 * | 5/2008 | Sen et al. | 257/40 |
| 7,531,157 B2 * | 5/2009 | Ford et al. | 423/447.1 |
| 7,842,432 B2 * | 11/2010 | Niu et al. | 429/512 |
| 7,854,914 B2 * | 12/2010 | Ford et al. | 423/447.2 |
| 7,858,185 B2 * | 12/2010 | Sen et al. | 428/408 |
| 7,939,218 B2 * | 5/2011 | Niu | 429/532 |
| 7,960,708 B2 * | 6/2011 | Wolfe et al. | 250/492.1 |

(Continued)

FOREIGN PATENT DOCUMENTS

| | | |
|---|---|---|
| KR | 10-2008-0031725 A | 4/2008 |
| KR | 10-2010-043446 A | 4/2010 |
| KR | 10-2010-0077475 A | 7/2010 |

*Primary Examiner* — Sing P Chan
(74) *Attorney, Agent, or Firm* — Sughrue Mion, PLLC

(57) ABSTRACT

Provided is single-walled carbon nanotube saturable absorber production via a multi-vacuum filtration method, and more particularly, single-walled carbon nanotube saturable absorber production via a multi-vacuum filtration method, capable of depositing a carbon nanotube thin film on a filter using a vacuum chamber and a membrane filter, etching the filter using an etchant so as to be transferred to an upper surface of the polymer, coating the polymer on the carbon nanotube to thereby produce a carbon nanotube saturable absorber, as a method of producing a carbon nanotube thin film to transfer the thin film to the polymer using a multi-filtration method in order to produce a passive saturable absorber to be used in laser oscillation.

6 Claims, 3 Drawing Sheets

(56) References Cited

U.S. PATENT DOCUMENTS

| | | | |
|---|---|---|---|
| 8,147,722 B2* | 4/2012 | Sen et al. | 252/502 |
| 8,187,502 B2* | 5/2012 | Sen et al. | 252/502 |
| 8,236,595 B2* | 8/2012 | Agarwal et al. | 438/49 |
| 8,318,126 B2* | 11/2012 | Wong et al. | 423/592.1 |
| 8,512,588 B2* | 8/2013 | Tringe et al. | 216/99 |
| 8,513,804 B2* | 8/2013 | Hellstrom et al. | 257/741 |
| 8,518,276 B2* | 8/2013 | Striemer et al. | 216/2 |
| 2002/0046872 A1* | 4/2002 | Smalley et al. | 174/137 A |
| 2002/0048632 A1* | 4/2002 | Smalley et al. | 427/230 |
| 2002/0068170 A1* | 6/2002 | Smalley et al. | 428/403 |
| 2005/0058590 A1* | 3/2005 | Sen et al. | 423/447.1 |
| 2005/0058797 A1* | 3/2005 | Sen et al. | 428/36.91 |
| 2005/0269553 A1* | 12/2005 | Sen et al. | 252/500 |
| 2005/0269554 A1* | 12/2005 | Sen et al. | 252/500 |
| 2006/0014375 A1* | 1/2006 | Ford et al. | 438/622 |
| 2006/0178559 A1* | 8/2006 | Kumar et al. | 600/109 |
| 2006/0278580 A1* | 12/2006 | Striemer et al. | 210/650 |
| 2007/0212538 A1* | 9/2007 | Niu | 428/367 |
| 2008/0179571 A1* | 7/2008 | Sen et al. | 252/502 |
| 2008/0224126 A1* | 9/2008 | Sen et al. | 257/40 |
| 2008/0280169 A1* | 11/2008 | Niu et al. | 429/13 |
| 2009/0073400 A1* | 3/2009 | Wolfe et al. | 355/53 |
| 2009/0140213 A1* | 6/2009 | Sen et al. | 252/502 |
| 2010/0143718 A1* | 6/2010 | Smalley et al. | 428/376 |
| 2010/0147762 A1* | 6/2010 | Zhang et al. | 210/490 |
| 2010/0210745 A1* | 8/2010 | McDaniel et al. | 521/55 |
| 2010/0233146 A1* | 9/2010 | McDaniel | 424/94.2 |
| 2010/0278720 A1* | 11/2010 | Wong et al. | 423/604 |
| 2010/0328845 A1* | 12/2010 | Hiralal et al. | 361/502 |
| 2011/0248401 A1* | 10/2011 | Hellstrom et al. | 257/741 |
| 2011/0284456 A1* | 11/2011 | Brozell | 210/500.21 |
| 2011/0300222 A1* | 12/2011 | Sailor et al. | 424/493 |
| 2012/0037591 A1* | 2/2012 | Tringe et al. | 216/2 |
| 2012/0097329 A1* | 4/2012 | Stern et al. | 156/345.3 |
| 2012/0320492 A1* | 12/2012 | Radivojevic et al. | 361/291 |
| 2013/0009109 A1* | 1/2013 | Sen et al. | 252/510 |
| 2013/0306549 A1* | 11/2013 | Tringe et al. | 210/500.22 |

* cited by examiner

SINGLE WALLED CARBON NANOTUBE SATURABLE ABSORBER PRODUCTION VIA MULTI-VACUUM FILTRATION METHOD

TECHNICAL FIELD

The following disclosure relates to single-walled carbon nanotube saturable absorber production using a multi-vacuum filtration method, and more particularly, to single-walled carbon nanotube saturable absorber production using a multi-vacuum filtration method, capable of depositing a carbon nanotube thin film on a filter using a vacuum chamber and a membrane filter, etching the filter using an etchant so as to be transferred to an upper surface of the polymer, coating the polymer on the carbon nanotube thin film to thereby produce a carbon nanotube saturable absorber, as a method of producing a carbon nanotube thin film to transfer the thin film to the polymer using a multi-filtration method in order to produce a passive saturable absorber to be used in laser oscillation.

BACKGROUND

Generally, a carbon nanotube has optical non-linearity 1000 times higher than that of other materials, such that the carbon nanotube is appropriate for use as a saturable absorber. In addition, in the carbon nanotube, a band-gap thereof is determined according to a diameter of the carbon nanotube and a rolling vector of a graphite plate due to a small size of a nano scale and a specific carbon bond. Since this band-gap is significantly small (0.4 eV or less) as compared with other semiconducting materials, the optical non-linearity may be significantly increased. In addition, since the nanotube may be produced so as to have various sizes while changing the diameter, the band-gap may be changed, such that the carbon nanotube has variability with respect to band-widths in which mode-lock may be performed. Further, generally, when a saturable absorber is interlocked with an existing optical device to be used, damage cannot help but occur at an external environment and a periphery junction part. However, the carbon nanotube may minimize this damage due to excellent mechanical strength as described above. In addition, the carbon nanotube may be easily produced, have significantly low producing cost, as compared with a semiconductor saturable absorber mirror (SESAM), and be easily combined with a fiber laser system in a film form, or the like.

The saturable absorber used in passive mode-locking system is a non-linear optical medium of which absorption is decreased when light intensity is increased. In the case in which the saturable absorber is inserted into a cavity, a pulse width may be shortened while pulse shuttles in the cavity, such that an ultra-fast light pulse may be generated.

As conditions of the saturable absorber for a mode-lock, the saturable absorber should have an absorption rate more than a gain constant of a semiconductor laser and a recovery time faster than a carrier relaxation time of the semiconductor laser. In the existing fiber laser system, the SESAM has been mainly used for the passive mode-lock. However, in the SESAM, a wavelength band in which the mode-lock may be performed is determined according to a thickness of a stacked semiconductor layer, but production of the semiconductor appropriate for the wavelength region of 1.3 to 1.5 um, which is a wavelength generally used in the fiber laser, requires a complicated process, such that producing cost may be high. In addition, it may be almost impossible to vary the wavelength band in which the mode lock may be performed, and it is difficult to combine the SESAM with the fiber laser system, such that the SESAM has many limitations.

In order to overcome this problem, the saturable absorber using a carbon nanotube has been mainly produced. A method of producing the saturable absorber using the carbon nanotube may be classified into two types, that is, a composite type method and a spray type method.

The composite type method is a method of co-dispersing a liquid polymer and a single-walled carbon nanotube (SWNT) and curing the dispersant to thereby produce the saturable absorber. In this method, the curing should be performed at a constant temperature for 1 week, such that it takes a long time to produce the saturable absorber. In addition, since the polymer and the SWNT are not uniformly mixed but sporadically mixed, incident laser may be irregularly reflected. Further, it may be difficult to adjust a thickness or optical absorbance of the saturable absorber at a desired degree.

The spray type method is a method of producing a saturable absorber by directly spraying a single walled carbon nanotube on a thin film polymer to dispose the single-walled carbon nanotube on the polymer. This method has a disadvantage in that it may be difficult to obtain a uniform surface due to characteristics of the spray type method, such that scattering of the laser may be generated, and it may be difficult to obtain the desired optical absorbance similarly to the composite type method.

As the related art, an ultrafast carbon nanotube saturable absorber for solid-state laser mode-locking has been disclosed in KR 10-2010-0043446. The related art relates to a carbon nanotube saturable absorber obtained by forming a carbon nanotube solution by mixing a single-walled carbon nanotube (SWCNT) produced from an electric discharge with diclobenzene (DCB), mixing the carbon nanotube solution with polymethyl methacrylate (PMMA) to produce a SWCNT/PMMA composite, and forming a thin film with the SWCNT/PMMA composite by a spin coating method on a substrate. In this case, it may be difficult to adjust the thickness or optical absorbance of the saturable absorber at a desired degree.

RELATED ART DOCUMENT

Patent Document

KR 10-2010-0043446 A (Apr. 29, 2010)

SUMMARY

An embodiment of the present invention is directed to providing single-walled carbon nanotube saturable absorber production via a multi-vacuum filtration method capable of uniformly forming a surface of the carbon nanotube thin film unlike the existing composite type method or spray method to thereby produce a carbon nanotube saturable absorber having a low scattering degree by producing a carbon nano thin film separately from a polymer using a multi-vacuum filtration method and coating both surfaces of the carbon nanotube thin film with the polymer to produce the saturable absorber, and capable of adjusting the desired optical absorbance of the saturable absorber by a method of individually producing the carbon nanotube thin film several times and then overlapping the produced thin films.

In one general aspect, single-walled carbon nanotube saturable absorber production via a multi-vacuum filtration method includes: filling a carbon nanotube mixed solution 200 in which a carbon nanotube solution and distilled water are mixed in a vacuum chamber 100 installed with a membrane filter 20 and filtering the solution to deposit a carbon nanotube thin film 10 on the membrane filter 20 (S10); separating the membrane filter 20 including the carbon nanotube thin film 10 deposited thereon from the vacuum chamber 100 to dry the membrane filter 20 (S20); floating the membrane filter 20 including the carbon nanotube thin film 10 deposited thereon on an etchant 400 and dissolving the membrane filter 20 to thereby remove the membrane filter 20 (S30); diluting the etchant 400 to replace the etchant 400 with distilled water 500 and then sinking a lower polymer film 30 under the carbon nanotube thin film 10 (S40); removing the distilled water 500 while adjusting a position of the lower polymer film 30 to deposit the carbon nanotube thin film 10 on the lower polymer film 30 (S50); and coating an upper polymer film 40 on the carbon nanotube thin film 10 deposited on the lower polymer film 30 (S60).

In S10, the carbon nanotube mixed solution 200 may be prepared at a low concentration and filtered through the membrane filter 20 several times to deposit the carbon nanotube thin film 10 on the membrane filter 20.

In S20, the membrane filter 20 including the carbon nanotube thin film 10 deposited thereon may be dried at room temperature for 10 minutes or more.

In S60, the upper polymer film 40 may be coated by a spin coating method.

The etchant 400 may be 3M NaOH solution.

The lower polymer film 30 may be made of polydimethylsiloxane.

[Detailed Description of Main Elements]

Figure 1:
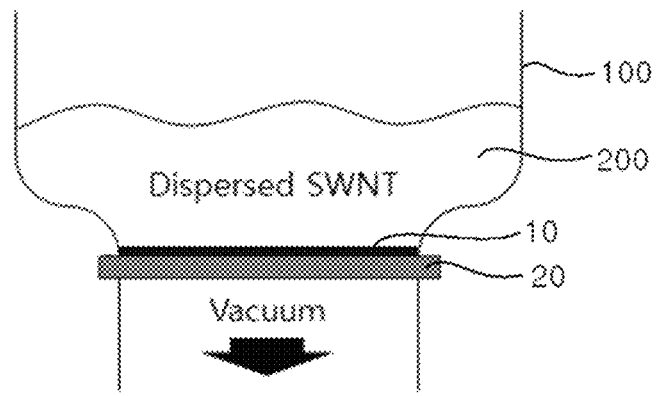
FIG. 1 is a schematic diagram showing a method of depositing a carbon nanotube thin film according to an exemplary embodiment of the present invention.

10: Carbon nanotube thin film
20: Membrane filter
30: Lower polymer film
40: Upper polymer film
100: Vacuum chamber
200: Carbon nanotube mixed solution
300: Petri dish

[Detailed Description of Main Elements]

400: Etchant
500: Distilled water

DETAILED DESCRIPTION OF EMBODIMENTS

Hereinafter, single-walled carbon nanotube saturable absorber production via a multi-vacuum filtration method will be described in detail with reference to the accompanying drawings.

Figure 2:
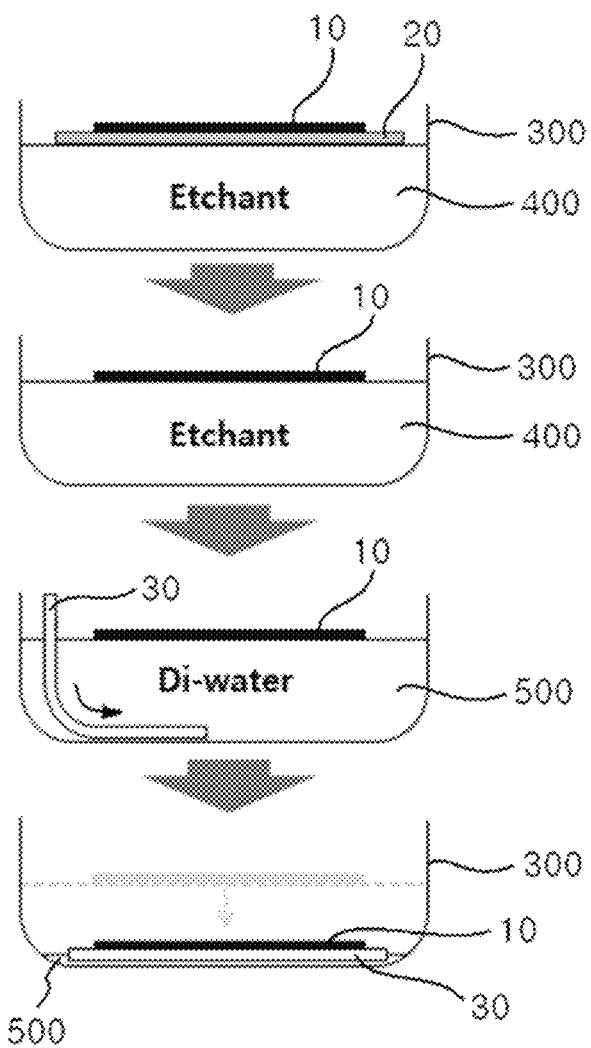
FIG. 2 is a schematic diagram showing a process of forming a polymer layer on a lower surface of the carbon nanotube thin film according to the exemplary embodiment of the present invention.

FIGS. 1 and 2 are schematic diagrams showing the single-walled carbon nanotube saturable absorber production via a multi-vacuum filtration method according to an exemplary embodiment of the present invention.

As shown in FIGS. 1 and 2, the single-walled carbon nanotube saturable absorber production via a multi-vacuum filtration method according to the exemplary embodiment of the present invention is configured to include filling a carbon nanotube mixed solution 200 in which a carbon nanotube solution and distilled water are mixed in a vacuum chamber 100 installed with a membrane filter 20 and filtering the solution to deposit a carbon nanotube thin film 10 on the membrane filter 20 (S10); separating the membrane filter 20 including the carbon nanotube thin film 10 deposited thereon from the vacuum chamber 100 to dry the membrane filter 20 (S20); floating the membrane filter 20 including the carbon nanotube thin film 10 deposited thereon on an etchant 400 and dissolving the membrane filter 20 to thereby remove the membrane filter 20 (S30); diluting the etchant 400 to replace the etchant 400 with distilled water 500 and then sinking a lower polymer film 30 under the carbon nanotube thin film (S40); removing the distilled water 500 while adjusting a position of the lower polymer film 30 to deposit the carbon nanotube thin film 10 on the lower polymer film 30 (S50); and coating an upper polymer film 40 on the carbon nanotube thin film 10 deposited on the lower polymer film 30 (S60).

First, S10 is a step of allowing a single-walled carbon nanotube (hereinafter, referred to as the carbon nanotube) to form a uniform layer. To this end, the membrane filter 20 made of porous cellulose is installed in the vacuum chamber 100, and distilled water is fully filled therein. The individualized carbon nanotube solution is dropped in the vacuum chamber 100 fully filled with the distilled water and captured on the membrane filter 20 while being continuously circulated by applying vacuum, such that the carbon nanotube thin film 10 is deposited on the membrane filter 20.

In this case, a filter having a pore smaller than a length of the carbon nanotube needs to be used as the membrane filter 20. Further, in S10, the carbon nanotube thin film 10 may be deposited on the membrane filter 20 by preparing the carbon nanotube mixed solution 200 at a low concentration and passing the solution through the membrane filter 20 several times. That is, as shown in FIG. 1, a process of filtering the carbon nanotube mixed solution 200 uniformly dispersed in the distilled water to allow the carbon nanotube to be uniformly distributed on the membrane filter 20 is performed several times at a low concentration, such that the carbon nanotube does not aggregate, thereby making it possible to uniformly producing the carbon nanotube thin film 10.

In addition, the carbon nanotube thin film 10 is cured through the separating of the membrane filter 20 including the carbon nanotube thin film 10 deposited thereon from the vacuum chamber 100 to dry the membrane filter 20 (S20). In this case, it is preferable that the membrane filter 20 including the carbon nanotube thin film 10 deposited thereon is dried at room temperature for 10 minutes or more.

FIG. 2 is a schematic diagram showing a process of forming a polymer layer on a lower surface of the carbon nanotube thin film according to the exemplary embodiment of the present invention and corresponds to processes of S30 to S50.

Then, in S30, the membrane filter 20 including the carbon nanotube thin film 10 deposited thereon is floated on the etchant 400 filled in a Petri dish 300, such that the membrane filter 20 was dissolved and removed. That is, when the membrane filter 20 is maintained at a state in which it contact the etchant 400 to thereby be floated by surface tension for 10 minutes, the membrane filter 20 is sufficiently dissolved and removed, such that only the carbon nanotube thin film 10 is floated on the etchant 400. Here, the etchant 400 may be 3M NaOH solution, and a preferable concentration thereof is 10 wt. %.

Further, in S40, the etchant 400 is diluted with distilled water in a state in which the carbon nanotube thin film 10 is floated on the etchant 400 as described above to allow the etchant to be completely replaced with the distilled water 500, and the lower polymer film 30 is sunk under the carbon nanotube thin film 10, such that the lower polymer film 30 is positioned on a bottom of the Petri dish 300.

In this case, the lower polymer film 30 may be made of polydimethylsiloxane, wherein since polydimethylsiloxane, which is silicon rubber or silicon resin, is a flexible material, it is easy to input the lower polymer film between the carbon nanotube thin film 10 and the Petri dish 300 to allow the lower polymer film to be positioned on the bottom of the Petri dish 300 as shown in FIG. 2.

S50 is a step of slowly removing the distilled water 500 while adjusting the position of the lower polymer film 30 so that the carbon nanotube thin film 10 is accurately deposited on the lower polymer film 30 to deposit the carbon nanotube thin film 10 on the lower polymer film 30.

Figure 3:
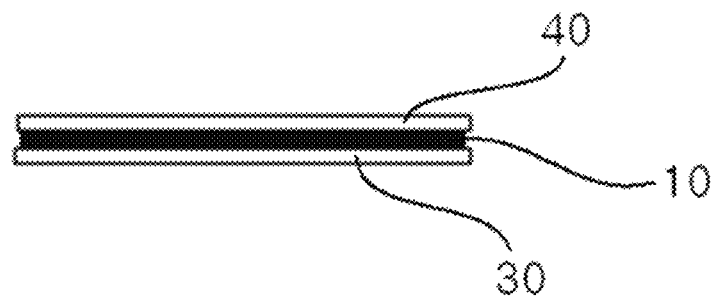
FIG. 3 is a schematic diagram showing a single-walled carbon nanotube saturable absorber produced by the single-walled carbon nanotube saturable absorber production via a multi-vacuum filtration method according to the present invention.

S60 is a step of picking out from the Petri dish 300 in a state in which the carbon nanotube thin film is deposited on the lower polymer film 30 to coat an upper polymer film 40 on the carbon nanotube thin film 10. That is, as shown in FIG. 3, in S60, the polymer films 30 and 40 are positioned on both surfaces of the carbon nanotube thin film 10 like a sandwich.

In this case, the upper polymer film 40 may be coated using a spin coating method.

The spin coating method is a method of disposing the lower polymer film 30 including the carbon nanotube thin film 10 deposited thereon on a spin coater, dropping a polymer solution onto the carbon nanotube thin film 10, and then rapidly rotating the carbon nanotube thin film 10 to form a polymer thin film. The upper polymer film 40 may be formed on the carbon nanotube thin film 10 by the spin coating method.

Therefore, in the single-walled carbon nanotube saturable absorber production via a multi-vacuum filtration method according to the exemplary embodiment of the present invention, a surface of the carbon nanotube thin film may be uniformly formed unlike the composite type method and the spray type method, such that the carbon nanotube saturable absorber having a low scattering degree may be produced.

In addition, the saturable absorber may be produced while adjusting the desired optical absorbance by a method of individually producing the carbon nanotube thin film several times and then overlapping the produced thin films.

Further, in light passing through the saturable absorber, absorption rate, a is changed as the following Equation.

$$\alpha(I) = \frac{\alpha_0}{1 + I/I_{sat}} + \alpha_{ns}.$$

In the Equation, I indicates intensity of incident light pulse, $\alpha_0$ and $\alpha_{ns}$ indicate linear limits of saturable absorption and non-saturable absorption, respectively. Further, $I_{sat}$ indicates saturation intensity. As may be seen by the Equation, since the absorption rate of the saturable absorber is changed according to the intensity of the incident pulse, when pulse components generated in a cavity pass through the saturable absorber, only a component having a high pulse intensity may be selectively transmitted. Optical pulses having a significantly short pulse width in a time axis may be generated by this phenomenon.

To this end, production of uniform thin film type carbon nanotube film is necessary. The uniform thin film type carbon nanotube film may be produced by the method in FIG. 1, and the saturable absorber that is necessary for fiber type mode locked femtosecond laser oscillation may be produced by the single-walled carbon nanotube saturable absorber production via a multi-vacuum filtration method according to the present invention.

Figure 6:
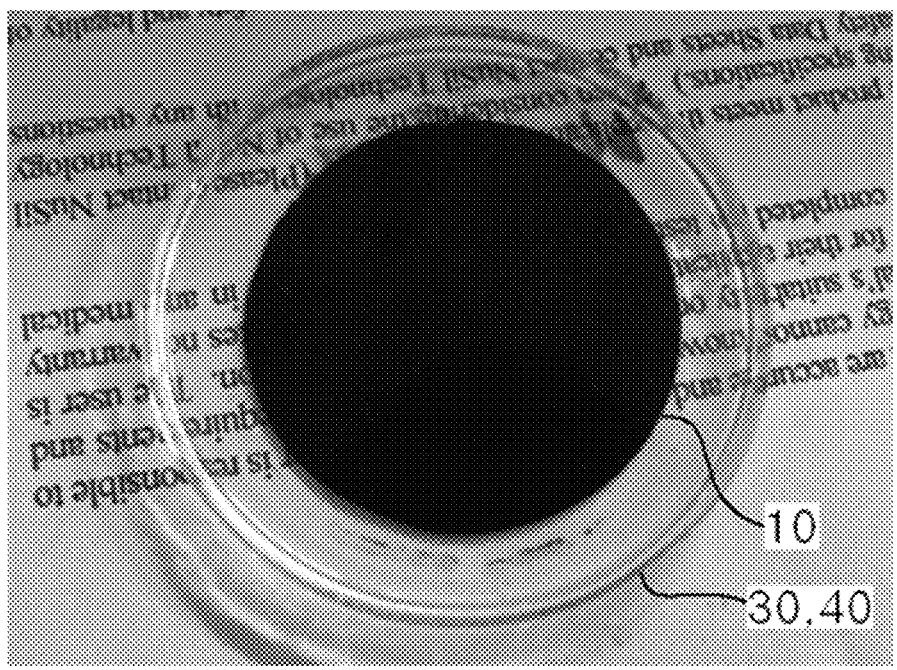
FIG. 6 is a photograph showing the single-walled carbon nanotube saturable absorber according to the exemplary embodiment of the present invention.

Further, FIG. 6 is a photograph showing the single-walled carbon nanotube saturable absorber according to the exemplary embodiment of the present invention. The single-walled carbon nanotube saturable absorber according to the present invention is configured so that the carbon nanotube thin film 10 is positioned between the lower and upper polymer films 30 and 40 and formed at inner portions of the polymer films 30 and 40 as shown in FIG. 6.

Figure 4:
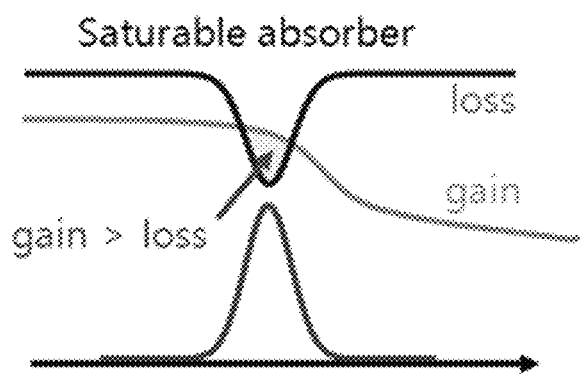
FIG. 4 is a graph for describing a laser oscillation principle of the single-walled carbon nanotube saturable absorber according to the exemplary embodiment of the present invention.
Figure 7:
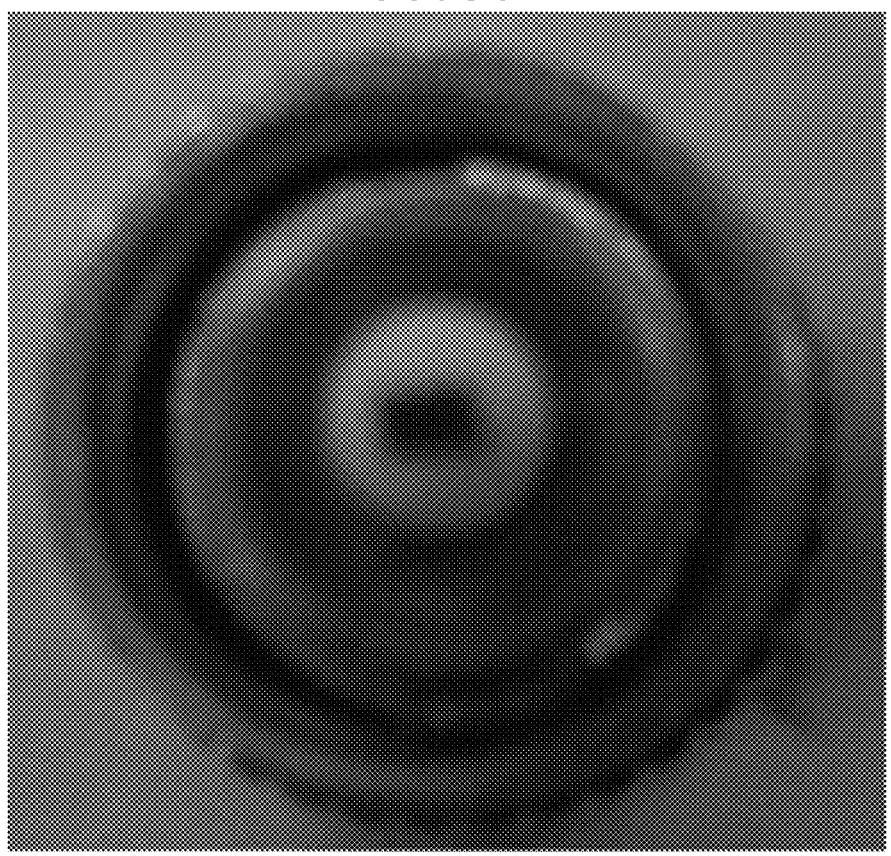
FIG. 7 is a photograph of a state in which single-walled carbon nanotube saturable absorber according to the exemplary embodiment of the present invention is attached to a distal end of a fiber in order to be used.

The single-walled carbon nanotube saturable absorber formed as described above is attached to a distal end of a fiber as shown in FIG. 7 to serve as the saturable absorber, such that laser oscillation may be performed. The reason is that when the laser passes through the saturable absorber, instantly, optical loss is smaller than optical gain, such that the laser is oscillated as may be seen by FIG. 4.

Figure 5:
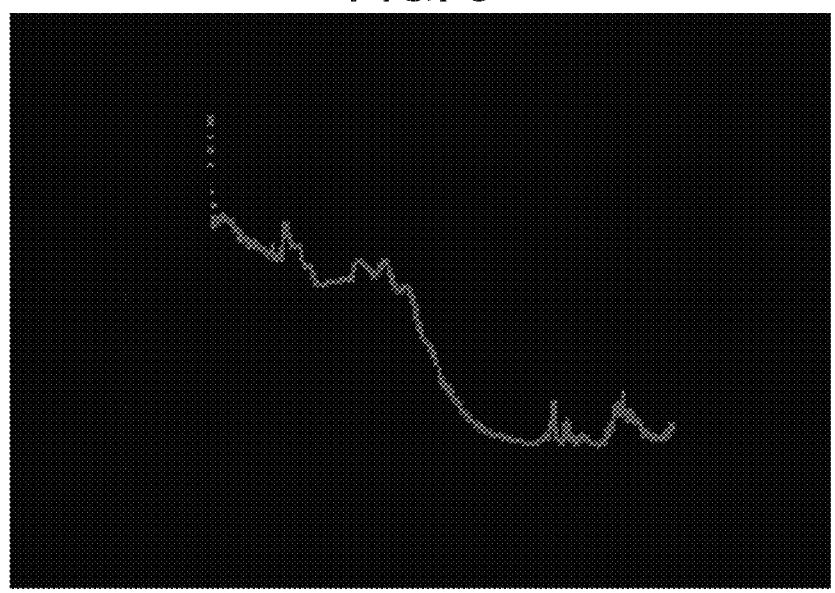
FIG. 5 is a graph showing absorbance spectrum analysis of the single-walled carbon nanotube saturable absorber according to the exemplary embodiment of the present invention.

FIG. 5 is a graph showing optical absorbance of the single-walled carbon nanotube saturable absorber according to the exemplary embodiment of the present invention at each wavelength.

With the single-walled carbon nanotube saturable absorber production via a multi-vacuum filtration method according to the exemplary embodiment of the present invention, a surface of the carbon nanotube thin film may be uniformly formed unlike the composite type method and the spray type method, such that the carbon nanotube saturable absorber having a low scattering degree may be produced.

In addition, the saturable absorber may be produced while adjusting the desired optical absorbance by a method of individually producing the carbon nanotube thin film several times and then overlapping the produced thin films.

The present invention is not limited to the above-mentioned exemplary embodiments but may be variously applied, and may be variously modified by those skilled in the art to which the present invention pertains without departing from the gist of the present invention claimed in the claims.

What is claimed is:
1. Single-walled carbon nanotube saturable absorber production via a multi-vacuum filtration method comprising:
filling a carbon nanotube mixed solution in which a carbon nanotube solution and distilled water are mixed in a vacuum chamber installed with a membrane filter and filtering the solution to deposit a carbon nanotube thin film on the membrane filter (S10);

separating the membrane filter including the carbon nanotube thin film deposited thereon from the vacuum chamber to dry the membrane filter (S20);

floating the membrane filter including the carbon nanotube thin film deposited thereon on an etchant and dissolving the membrane filter to thereby remove the membrane filter (S30);

diluting the etchant to replace the etchant with distilled water and then sinking a lower polymer film under the carbon nanotube thin film (S40);

removing the distilled water while adjusting a position of the lower polymer film to deposit the carbon nanotube thin film on the lower polymer film (S50); and coating an upper polymer film on the carbon nanotube thin film deposited on the lower polymer film (S60).

2. The single-walled carbon nanotube saturable absorber production via a multi-vacuum filtration method of claim 1, wherein in S10, the carbon nanotube mixed solution is prepared at a low concentration and filtered through the membrane filter several times to deposit the carbon nanotube thin film on the membrane filter.

3. The single-walled carbon nanotube saturable absorber production via a multi-vacuum filtration method of claim 1, wherein in S20, the membrane filter including the carbon nanotube thin film deposited thereon is dried at room temperature for 10 minutes or more.

4. The single-walled carbon nanotube saturable absorber production via a multi-vacuum filtration method of claim 1, wherein in S60, the upper polymer film is coated by a spin coating method.

5. The single-walled carbon nanotube saturable absorber production via a multi-vacuum filtration method of claim 1, wherein the etchant is 3M NaOH solution.

6. The single-walled carbon nanotube saturable absorber production via a multi-vacuum filtration method of claim 1, wherein the lower polymer film is made of polydimethylsiloxane.

\* \* \* \* \*